United States Patent
Kimura et al.

(10) Patent No.: US 9,457,583 B2
(45) Date of Patent: Oct. 4, 2016

(54) LIQUID STORAGE CONTAINER

(71) Applicant: SEIKO EPSON CORPORATION, Tokyo (JP)

(72) Inventors: Naomi Kimura, Nagano (JP); Yasuyuki Kudo, Nagano (JP); Yuichi Nishihara, Nagano (JP); Masashi Kamiyanagi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/769,879

(22) PCT Filed: Feb. 24, 2014

(86) PCT No.: PCT/JP2014/000953
§ 371 (c)(1),
(2) Date: Aug. 24, 2015

(87) PCT Pub. No.: WO2014/132614
PCT Pub. Date: Sep. 4, 2014

(65) Prior Publication Data
US 2016/0009098 A1     Jan. 14, 2016

(30) Foreign Application Priority Data
Feb. 26, 2013   (JP) ................................ 2013-035512

(51) Int. Cl.
*B41J 2/175*     (2006.01)
*G01F 23/24*     (2006.01)

(52) U.S. Cl.
CPC ......... *B41J 2/17526* (2013.01); *B41J 2/17566* (2013.01); *G01F 23/241* (2013.01); *B41J 2002/17579* (2013.01)

(58) Field of Classification Search
CPC ................... B41J 2002/17579; B41J 2/17566
USPC .................................................. 347/7, 19, 86
See application file for complete search history.

(56) References Cited

U.S. PATENT DOCUMENTS

| | | | |
|---|---|---|---|
| 4,196,625 A | 4/1980 | Kern | |
| 6,286,921 B1 * | 9/2001 | Ochi et al. | 347/7 |
| 2003/0052938 A1 | 3/2003 | Inui et al. | |

FOREIGN PATENT DOCUMENTS

| | | |
|---|---|---|
| JP | 54-010735 A | 1/1979 |
| JP | 60-078323 A | 5/1985 |
| JP | 01-304950 A | 12/1989 |
| JP | 06-270410 A | 9/1994 |
| JP | 06-286160 A | 10/1994 |
| JP | 2001-205801 A | 7/2001 |
| JP | 2003-089219 A | 3/2003 |
| JP | 2006-159613 A | 6/2006 |
| JP | 2013-218359 A | 11/2012 |

* cited by examiner

*Primary Examiner* — Henok Legesse
(74) *Attorney, Agent, or Firm* — Global IP Counselors, LLP

(57) ABSTRACT

A liquid storage container includes the first electrode, the second electrode which penetrate from an outside to an inside of a storage portion and extend in a direction intersecting a vertical direction, and a support portion which is provided in the storage portion and supports the first electrode. In the vertical direction, a height of the second electrode is equal to a height of the first electrode or is lower than the height of the first electrode. The support portion includes a support wall which supports the first electrode and a side wall intersects the support wall and is wide from the support wall in the vertically downward direction. The support wall is capable of being protruded to the second electrode side further than a meniscus formed in the ink between the first electrode and the support wall in the second electrode of the first electrode.

14 Claims, 13 Drawing Sheets

LIQUID STORAGE CONTAINER

TECHNICAL FIELD

The present invention relates to a liquid storage container, and the like.

BACKGROUND ART

In an ink jet printer which is an example of a liquid consumption apparatus, printing on a print medium is performed by discharging ink, which is an example of liquid, from a print head onto the print medium such as a print sheet. In a tank (an example of a liquid storage container) which retains the ink for being supplied to the print head, in the related art, a method has been known in which a remaining amount of the ink is detected from a change in a resistance value between two electrodes extending from the outside of the tank to the inside of the tank (for example, refer to PTL 1).

CITATION LIST

Patent Literature

PTL 1: Japanese Unexamined Patent Application Publication No. 6-270410

SUMMARY OF INVENTION

Technical Problem

In an electrode extending from the outside of a tank to the inside of the tank, it is difficult to improve positional accuracy (deflection accuracy of electrode) of an end portion of the electrode on the inside of the tank. When the positional accuracy of the end portion of the electrode varies, detection effect of a remaining amount of ink varies. For this reason, in the liquid storage container of the related art, there is a problem in that it is difficult to improve detection accuracy of the remaining amount of the liquid.

Solution to Problem

The present invention is provided to solve at least a part of the above described problems, and is realized in forms or application examples to be described below.

Application Example 1

A liquid storage container includes: a storage portion that is capable of storing liquid; a first electrode that is a rod-shaped electrode penetrating a wall of the storage portion from an outside of the storage portion to an inside of the storage portion, and extends in a direction intersecting a vertical direction in the storage portion; a second electrode that is a rod-shaped electrode penetrating the wall of the storage portion from the outside of the storage portion to the inside of the storage portion, is arranged in parallel to the first electrode in a direction intersecting the extending direction of the first electrode in the storage portion, and extends in a direction intersecting the vertical direction in a state of being separated from the first electrode; and a support portion that is provided in the storage portion, and supports the first electrode. In the vertical direction, with respect to the first electrode, a height of the second electrode is equal to a height of the first electrode or lower than the height of the first electrode, the support portion includes a support wall supporting the first electrode, and a side wall which intersects the support wall on the second electrode side of the first electrode and on the first electrode side further than the second electrode and extends downwardly from the support wall, and the support wall is formed to be capable of being protruded to the second electrode side further than a meniscus formed in the liquid between the first electrode and the support wall on the second electrode side of the first electrode.

In the liquid storage container of this application example, since the first electrode is supported by the support portion, positional accuracy of the end portion inside the storage portion of the first electrode is easily improved. Accordingly, in the liquid storage container, detection accuracy of the remaining amount of the liquid is easily improved. In addition, in the liquid storage container, the side wall of the support portion is positioned between the first electrode and the second electrode. That is, the second electrode is separated from the side wall. For this reason, when a liquid level is lower than the support wall in the vertical direction, conduction between the first electrode and the second electrode is easily cut off. As a result, the detection accuracy of the remaining amount of the liquid is easily improved. In addition, the support wall is formed to be capable of being protruded to the second electrode side further than the meniscus formed in the liquid between the first electrode and the support wall on the second electrode side of the first electrode. Accordingly, connection of the liquid between the first electrode and the second electrode is easily cut off between the first electrode and the side wall. For this reason, when the liquid level is lower than the support wall in the vertical direction, the communication between the first electrode and the second electrode is easily cut off. As a result, the detection accuracy of the remaining amount of the liquid is easily improved.

Application Example 2

In the liquid storage container, in the vertical direction, with respect to the first electrode, a height of the second electrode is lower than a height of the first electrode.

In the application example, with respect to the first electrode, since the height of the second electrode is lower than the height of the first electrode, even when the height of the second electrode varies, when the liquid level is lower than the support wall in the vertical direction, the conduction between the first electrode and the second electrode is easily cut off. For this reason, influence on variation in a position of the second electrode with respect to the detection accuracy of the remaining amount of the liquid is easily excluded. As a result, the detection accuracy of the remaining amount of the liquid is easily improved.

Application Example 3

In the liquid storage container, a groove which is concave toward a side of the support wall opposite to the first electrode side is provided in the support wall of the support portion, and at least a part of the first electrode is placed in the groove.

In the application example, since at least a part of the first electrode is placed in the groove of the support portion, the positional accuracy of the first electrode on the inside of the storage portion is easily improved. As a result, the detection accuracy of the remaining amount of the liquid is easily further improved.

Application Example 4

In the liquid storage container, a second support portion that is provided in the storage portion and supports the second electrode is further included, the second support portion includes a second support wall which supports the second electrode, and the second side wall which intersects the second support wall on the first electrode side of the second electrode and on the second electrode side further than the side wall and extends downwardly from the second support wall, and the second support wall is formed to be capable of being protruded to the first electrode side further than the meniscus of the liquid formed between the second electrode and the second support wall on the first electrode side of the second electrode.

In the application example, since the second electrode is supported by the second support portion, the positional accuracy of the end portion of the second electrode on the inside of the storage portion is easily improved. Accordingly, in the liquid storage container, the detection accuracy of the remaining amount of the liquid is easily further improved. In addition, in the liquid storage container, the second side wall of the second support portion is positioned between the second electrode and the side wall of the support portion. That is, the first electrode is separated from the second side wall. For this reason, when the liquid level is lower than the second support wall in the vertical direction, the conduction between the first electrode and the second electrode is easily cut off. As a result, the detection accuracy of the remaining amount of the liquid is easily improved. In addition, the second support wall is formed to be capable of being protruded to the first electrode side further than the meniscus of the liquid formed between the second electrode and the second support wall on the first electrode side of the second electrode. Accordingly, connection of the liquid between the first electrode and the second electrode is easily cut off between the second electrode and the second side wall. For this reason, when the liquid level is lower than the second support wall in the vertical direction, the conduction between the first electrode and the second electrode is easily cut off. As a result, the detection accuracy of the remaining amount of the liquid is easily improved.

Application Example 5

In the liquid storage container, a second groove which is concave toward a side of the second support wall opposite to the second electrode side is provided in the second support wall of the second support portion, and at least a part of the second electrode is placed in the second groove.

In the application example, since at least a part of the second electrode is placed in the second groove of the second support portion, the positional accuracy of the second electrode on the inside of the storage portion is easily improved. As a result, the detection accuracy of the remaining amount of the liquid is easily further improved.

Application Example 6

A liquid storage container includes: a storage portion that is capable of storing liquid; a first electrode that is capable of being used for detecting the liquid; a second electrode that is capable of being used for detecting the liquid; and a support portion that supports the first electrode. The first electrode has a rod shape which extends from the outside of the storage portion to the inside of the storage portion, the second electrode is disposed by being separated from the first electrode, the support portion includes a support wall, which is a surface brought into contact with the first electrode, and an end portion positioned between the first electrode the second electrode, and a distance between a part brought into contact with the first electrode and the end portion in the support wall is made to be greater than a width of a meniscus of the liquid which is formed between the first electrode and the support wall, in a direction from the first electrode toward the end portion.

In the liquid storage container of this application example, the distance between the part brought into contact with the first electrode and the end portion in the support wall is made to be greater than the width of the meniscus of the liquid which is formed between the first electrode and the support wall, in a direction from the first electrode toward the end portion. Accordingly, when the liquid stored in the storage portion is consumed and the liquid level is lowered in the vertical direction, the connection of the liquid between the first electrode and the second electrode is easily cut off between the first electrode and the end portion. For this reason, when the liquid level is lower than the support wall in the vertical direction, the conduction between the first electrode and the second electrode is easily cut off. As a result, the detection accuracy of the remaining amount of the liquid is easily improved.

Application Example 7

In the liquid storage container, the storage portion includes a first wall, a second wall which is formed so as to be protruded from the first wall, in a direction intersecting the first wall, a third wall which is formed so as to be protruded from the first wall and formed at a position facing the second wall, in a direction intersecting the first wall, a fourth wall which is protruded from the first wall, in a direction intersecting the first wall, the second wall, and the third wall, and a fifth wall which is protruded from the first wall in the direction intersecting the first wall, the second wall, and the third wall, and the first electrode penetrates the third wall of the storage portion from the outside of the storage portion toward the inside of the storage portion, and extends from the third wall toward the second wall.

In the liquid storage container of the application example, the first electrode penetrates the third wall of the storage portion from the outside of storage portion toward the inside of the storage portion, and extends from the third wall toward the second wall. Accordingly, the first electrode can be easily provided in the liquid storage container.

Application Example 8

In the liquid storage container, the second electrode penetrates the third wall of the storage portion from the outside of the storage portion toward the inside of the storage portion, and extends from the third wall toward the second wall.

In the liquid storage container of the application example, the second electrode can be easily provided in the liquid storage container. In addition, the first electrode and the second electrode can extend in the same direction. Accordingly, since the distance between the first electrode and the second electrode can be uniformly maintained, the detection accuracy of the liquid between the first electrode and the second electrode can be improved.

Application Example 9

In the liquid storage container described above, the second electrode is disposed by being separated from the first electrode in a direction intersecting the first wall.

In the liquid storage container of the application example, the second electrode is disposed so as to be separated from the first electrode in a direction intersecting the first wall. When the distance between the first electrode and the second electrode is great, since the resistance value between the electrodes when there is the liquid between the first electrode and the second electrode increases, the difference between the resistance value described above and a resistance value between the electrodes when there is no liquid is small. As a result, the detection accuracy of the liquid decreases. However, a region where it is possible to detect the liquid can be widened. Since the resistance value between the electrodes, when there is the liquid between the electrodes, decreases when the distance between the first electrode and the second electrode is small, a difference between the resistance value described above and a resistance value between the electrodes when there is no liquid is great. For this reason, the detection accuracy of the liquid can be improved. Therefore, detection circumstances can be changed by making the electrodes separated.

Application Example 10

In the liquid storage container, the support portion is positioned between the fourth wall and the fifth wall, and a distance between the first electrode and the fourth wall is equal to or greater than a distance between the second electrode and the fourth wall.

In the liquid storage container of the application example, the distance between the first electrode and the fourth wall is equal to or greater than the distance between the second electrode and the fourth wall. According to this, the detection accuracy of the liquid can be improved only by a configuration in which the support portion supports the first electrode.

Application Example 11

In the liquid storage container, the end portion is positioned between the first electrode and the second electrode in a direction intersecting the first wall.

In the liquid storage container of the application example, the end portion is positioned between the first electrode and the second electrode in the direction intersecting the first wall. In a structure in which the end portion does not reach the second electrode, the support wall also does not reach the second electrode. According to this, it is possible to suppress the influence of the meniscus of the liquid formed between the first electrode and the support wall on a position of the second electrode.

Application Example 12

In the liquid storage container, the support portion includes a side wall which extends from the end portion toward the fourth wall.

In the liquid storage container of the application example, since the side wall extending from the end portion toward the fourth wall is included, strength of the support portion can be enhanced. Accordingly, accuracy of a position on which the first electrode is disposed can be improved. As a result, the detection accuracy of the liquid can be improved.

Application Example 13

In the liquid storage container, a curved surface portion is provided between the third wall and the fifth wall, and the third wall, the fifth wall, and the curved surface portion form a single surface with no boundary therein.

In the liquid storage container of the application example, among the walls constituting the storage portion, the curved surface portion is provided between the third wall and the fifth wall, and the third wall, the fifth wall, and the curved surface portion form the single surface with no boundary therein. Accordingly, strength with respect to an impact from the outside of the storage portion can be improved.

Application Example 14

In the liquid storage container described above, the second wall is a viewable surface where it is possible to visually recognize level of the liquid, and there is an angle portion between the second wall and the fifth wall, and between the second wall and the fourth wall.

In the liquid storage container of the application example, the second wall is the viewable surface where it is possible to visually recognize the liquid level of the liquid, and the angle portion is between the second wall and the fifth wall, and between the second wall and the fourth wall. Since the second wall is the viewable surface, it is preferable that the second wall has a flat surface where the change of the liquid is easily visually recognized. As a result, the detection accuracy of the liquid can be improved.

DESCRIPTION OF EMBODIMENTS

Figure 1:
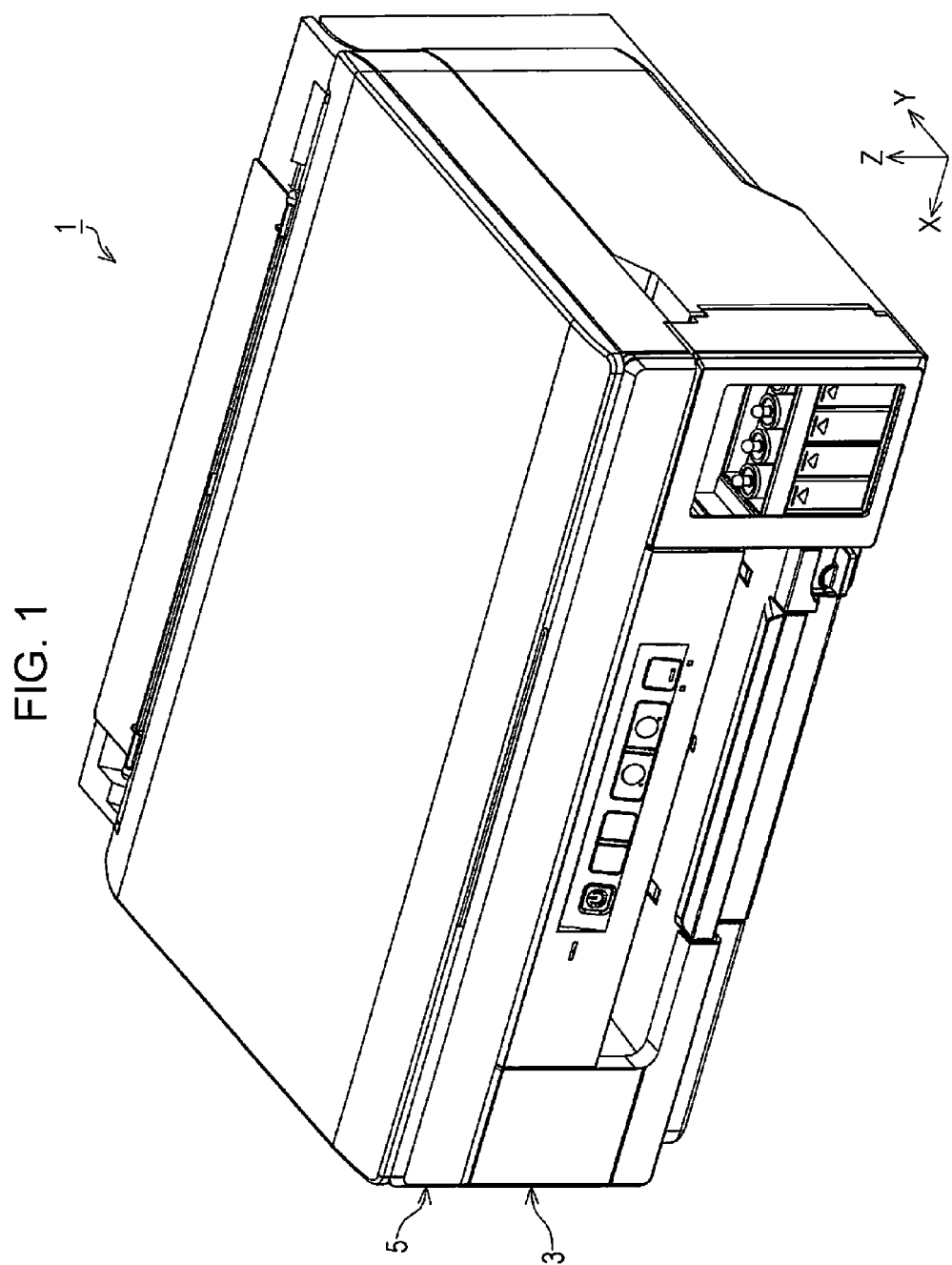
FIG. 1 is a perspective view illustrating a complex machine in an embodiment.

In an embodiment, a complex machine including a printer which is an example of a liquid consumption apparatus, will be exemplified with reference to drawings. In the embodiment, the complex machine 1 includes a printer 3 and a scanner 5 as illustrated in FIG. 1. In the complex machine 1, the printer 3 and the scanner 5 overlap each other. In a state in which the printer 3 is used, the scanner 5 overlaps in a vertical direction of the printer 3. Moreover, in FIG. 1, X, Y, and Z axes which are coordinate axes orthogonal with each other are attached. The X, Y, and Z axes are also attached in the other drawings hereinafter as needed. In FIG. 1, the printer 3 is disposed on a horizontal flat surface (XY flat surface) regulated by an X-axis direction and a Y-axis direction. In the state in which the printer 3 is used, a Z-axis direction is a direction which is orthogonal to the XY flat surface, and a − Z-axis direction is a vertically downward direction.

Figure 2:
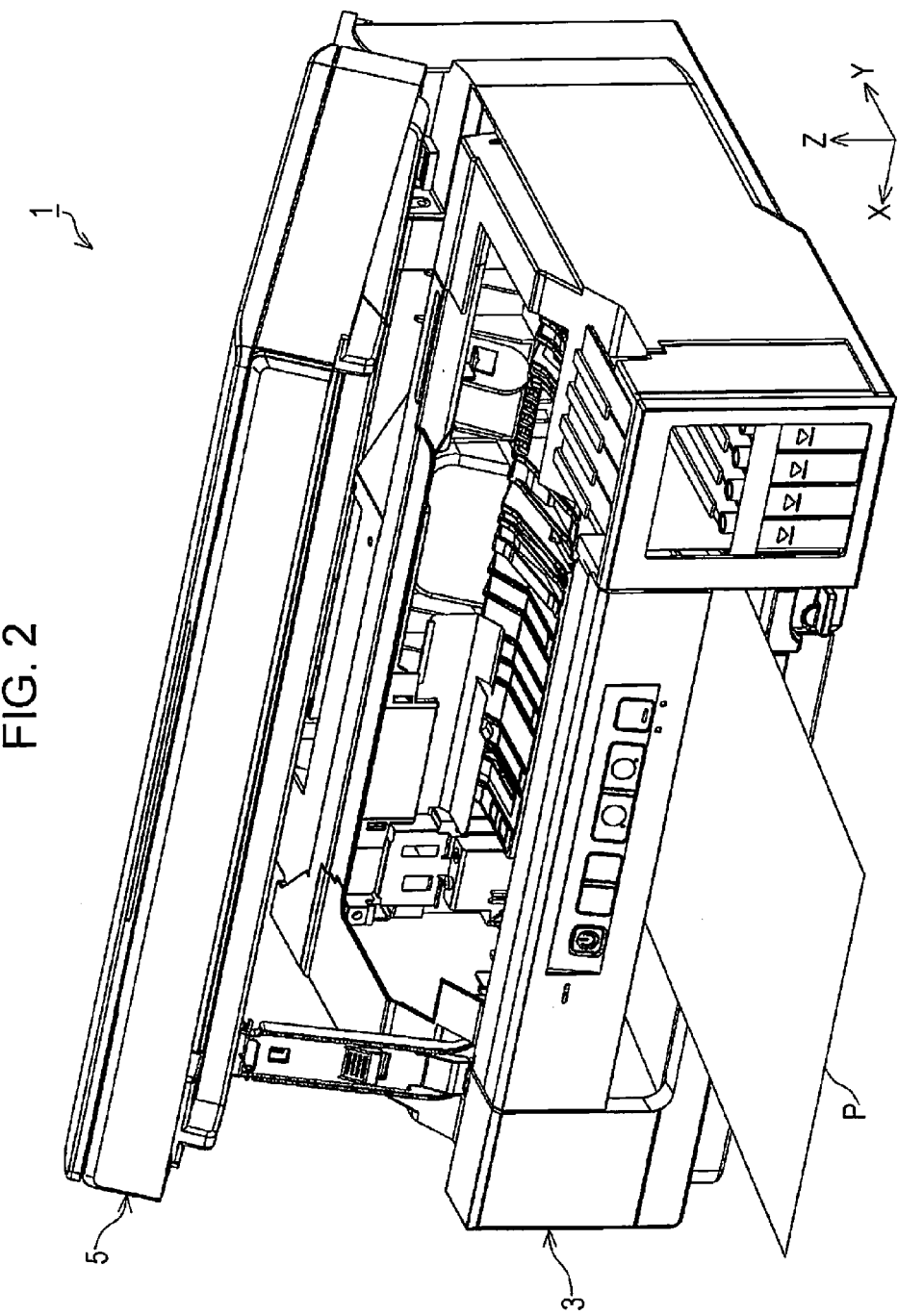
FIG. 2 is a perspective view illustrating the complex machine in the embodiment.

The scanner 5 includes an imaging element (not illustrated) such as an image sensor. The scanner 5 can read an image, or the like, recorded on a medium such as a sheet, as image data through an imaging element. For this reason, the scanner 5 functions as an apparatus which reads the image, or the like. As illustrated in FIG. 2, the scanner 5 is configured to be rotatable with respect to the printer 3. Also, the scanner 5 has a function as a cover of the printer 3.

Figure 3:
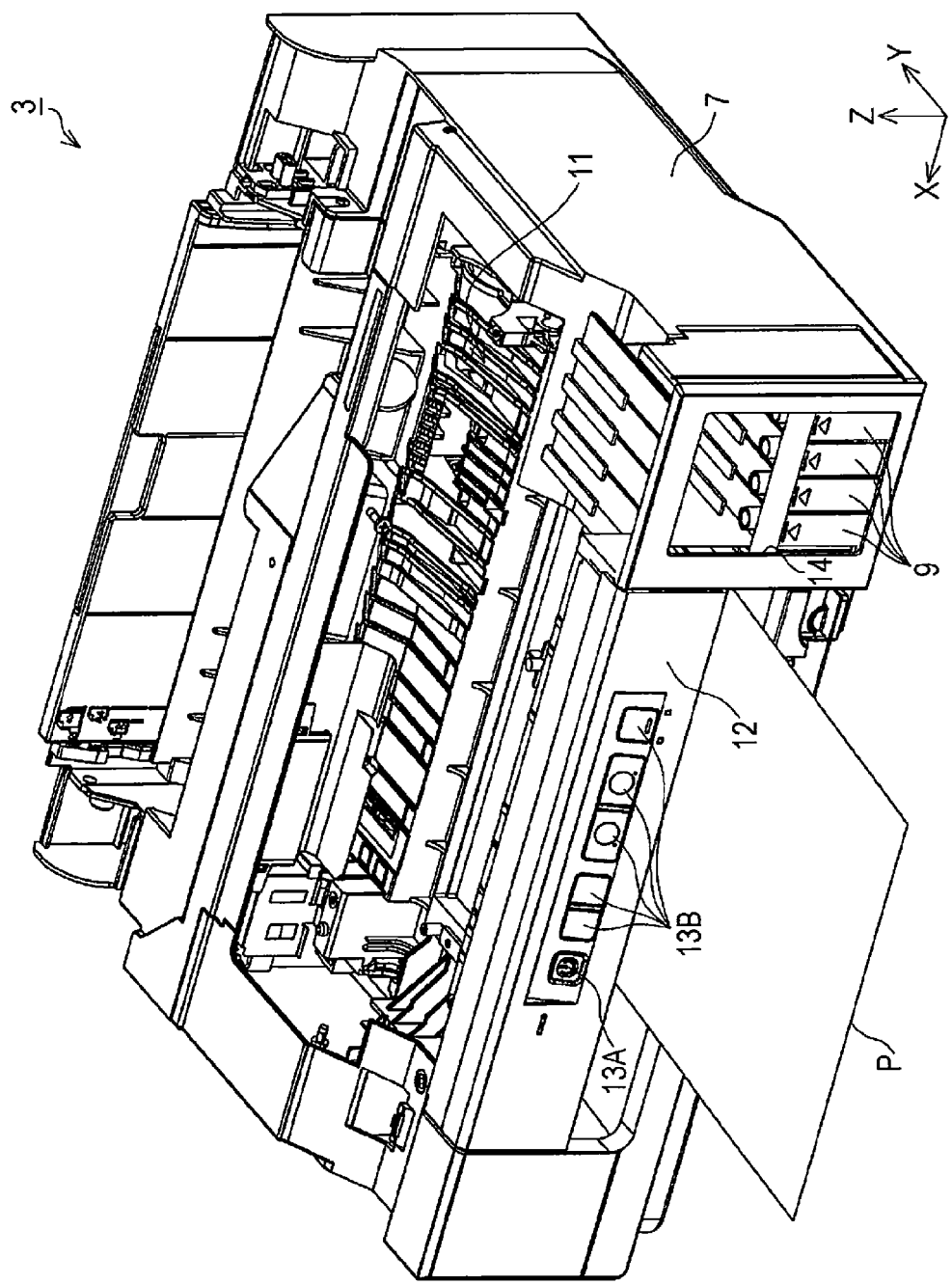
FIG. 3 is a perspective view illustrating a printer in the embodiment.

The printer 3 can perform printing on the print medium P such as a print sheet using the ink which is an example of liquid. As illustrated in FIG. 3, the printer 3 includes a case 7 and a plurality of tanks 9. The case 7 is configured as an exterior of the printer 3, and stores a mechanism body 11 of the printer 3. The plurality of tanks 9 is stored the inside of the case 7, and respectively stores the ink being supplied when printing. In the embodiment, four tanks 9 are provided. The four tanks 9 have respectively different types of the ink from each other. In the embodiment, as the type of the ink, four types of black, yellow, magenta, and cyan are prepared. Also, the four tanks 9 which have the different types of the ink from each other are provided.

In addition, the printer 3 includes an operation panel 12. In the operation panel 12, a power button 13A or other operation buttons 13B are provided. An operator who operates the printer 3, in a state of facing the operation panel 12, can operate the power button 13A or the operation button 13B. In the printer 3, a surface on which the operation panel 12 is provided is a front surface. In the front surface of the printer 3, a window portion 14 is provided on the case 7. The window portion 14 has light-transmissive properties. Also, the four tanks 9 described above are provided at a position where the window portion 14 is overlapped. For this reason, the operator can recognize the four tanks 9 through the window portion 14.

In the embodiment, a position facing the window portion 14 of each tank 9 has light-transmissive properties. From the position of each tank 9 having light-transmissive properties, the ink in the tank 9 can be visually recognized. Accordingly, the operator can visually recognize an amount of the ink in each tank 9 by visually recognizing the four tanks 9 through the window portion 14. In the embodiment, since the window portion 14 is provided on the front surface of the printer 3, the operator can visually recognize each tank 9 from the window portion 14 in a state of facing the operation panel 12. For this reason, the operator can recognize a remaining amount of the ink in each tank 9 while operating the printer 3.

Figure 4:
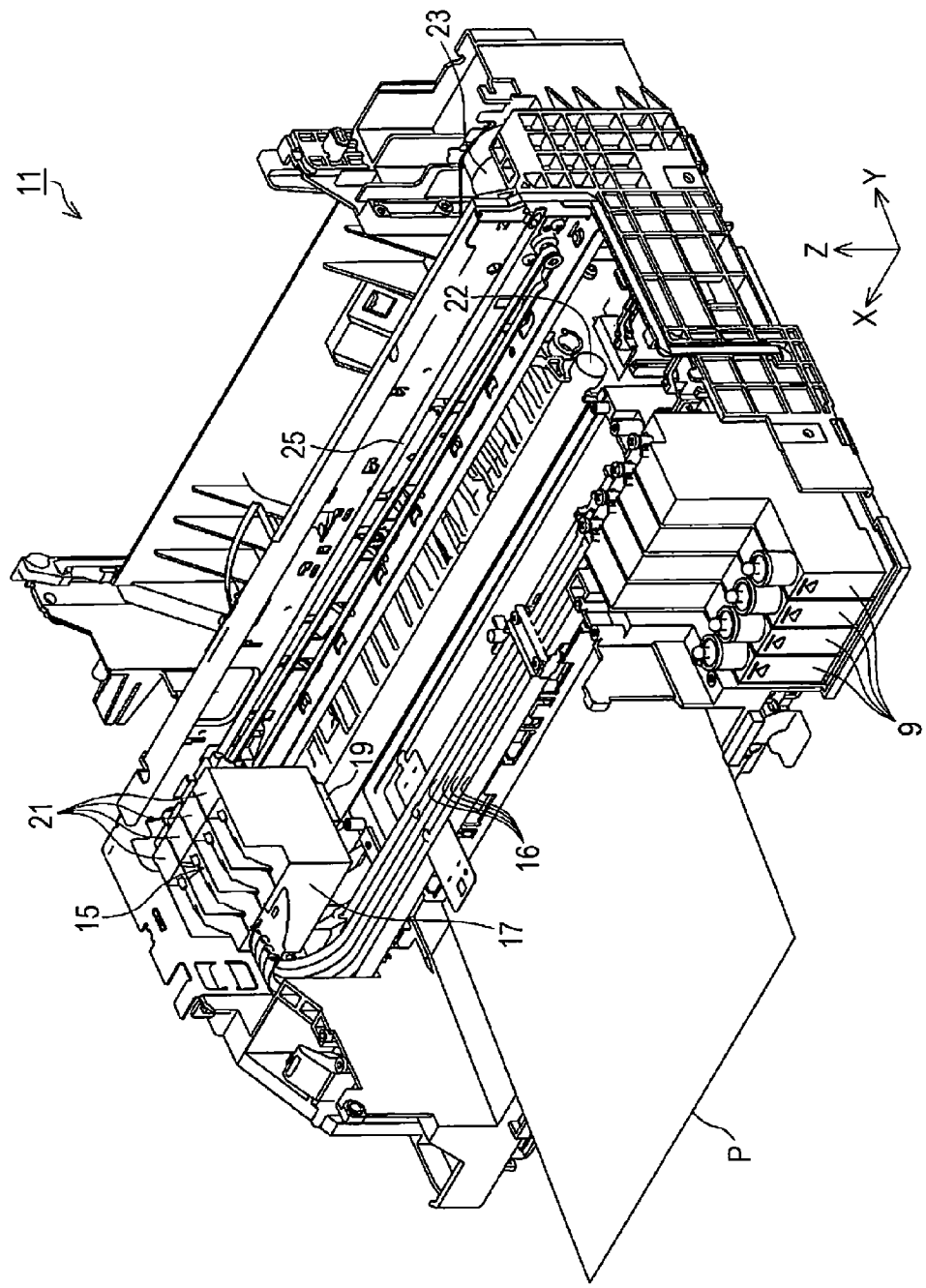
FIG. 4 is a perspective view illustrating a mechanism body of the printer in the embodiment.

The printer 3 includes a printing unit 15 and a supply tube 16, as illustrated in FIG. 4 which is a perspective view illustrating the mechanism body 11. The printing unit 15 includes a carriage 17 and a print head 19, and four relay units 21. A print head 19 and the four relay units 21 are mounted on the carriage 17. The supply tube 16 has flexibility, and is provided between the tank 9 and the relay unit 21. The ink in the tank 9 is sent to the relay unit 21 through the supply tube 16. The relay unit 21 relays the ink supplied from the tank 9 through the supply tube 16 to the print head 19. The print head 19 discharges the supplied ink as ink droplets.

In addition, the printer 3 includes a medium transportation mechanism (not illustrated) and a head transportation mechanism (not illustrated). The medium transportation mechanism transports a print medium P along the Y-axis direction by driving a transportation roller 22 with a power of a motor (not illustrated). The head transportation mechanism transports the carriage 17 along the X-axis direction by transmitting the power from the motor 23 through a timing belt 25 to the carriage 17. As described above, the print head 19 is mounted on the carriage 17. For this reason, the print head 19 is transported in the X-axis direction by the head transportation mechanism, through the carriage 17. A relative position of the print head 19 with respect to the print medium P is changed by the medium transportation mechanism and the head transportation mechanism so that printing is performed on the print medium P by discharging the ink from the print head 19.

Moreover, in the printer 3, it is defined that a direction where the print head 19 is transported through the carriage 17 is the X-axis direction and a direction where the print medium P is transported is the Y-axis direction. Also, a direction, which is orthogonal to both the X-axis direction and the Y-axis direction, is the Z-axis direction. In a state in which the printer 3 is used, the X-axis direction and the Y-axis direction are respectively horizontal directions and the Z-axis direction is the vertical direction.

EXAMPLE 1

Figure 5:
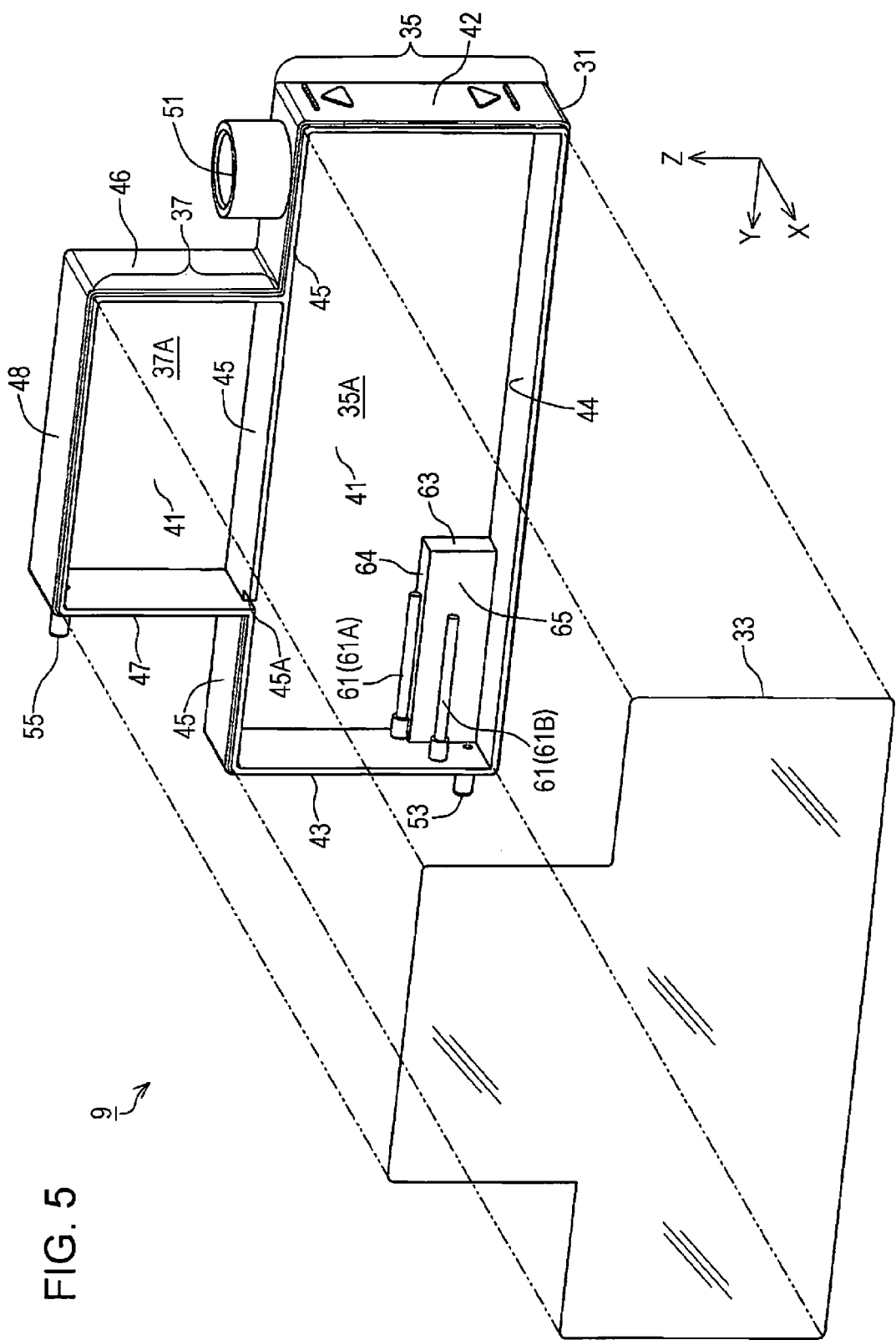
FIG. 5 is an exploded perspective view illustrating a schematic configuration of a tank in Example 1.

The tank 9 includes a case 31 and a sheet member 33, as illustrated in FIG. 5. The case 31 is made of, for example, synthetic resin such as nylon or polypropylene. In addition, the sheet member 33 is formed in a film shape with the synthetic resin (for example, nylon, polypropylene, or the like), and has the flexibility. The case 31 includes a storage portion 35 and an atmosphere chamber 37.

The storage portion 35 includes a first wall 41, a second wall 42, a third wall 43, a fourth wall 44, and a fifth wall 45. The second wall 42, the third wall 43, the fourth wall 44, and the fifth wall 45 are respectively protruded from the first wall 41 in a direction intersecting the first wall 41. The second wall 42 and the third wall 43 are provided at a position where the second wall 42 and the third wall 43 face each other with the first wall 41 interposed therebetween in the Y-axis direction. The fourth wall 44 and the fifth wall 45 are provided at a position where the fourth wall 44 and the fifth wall 45 face each other with the first wall 41 interposed therebetween in the Z-axis direction. The second wall 42 respectively intersects the fourth wall 44 and the fifth wall 45. The third wall 43 also respectively intersects the fourth wall 44 and the fifth wall 45. In a state in which the printer 3 is used, the fourth wall 44 corresponds to a bottom portion of the tank 9.

Moreover, a shape of the storage portion 35 is not limited to a shape disclosed in FIG. 5, the shape may be a continuous curved surface without forming an angle in a boundary of mutual boundaries between the second wall 42, the third wall 43, the fourth wall 44, and the fifth wall 45 (not illustrated). For example, the second wall 42 which is a viewable surface of a liquid level is preferably a flat shaped surface, and therefore, it is preferable that an angle is formed in a boundary between the second wall 42 and the adjacent fifth wall 45. Meanwhile, for example, a boundary between the third wall 43 and the fifth wall 45 may be a continuous curved surface. That is, the third wall 43 and the fifth wall 45 may be formed in a single wall without a boundary therein. Accordingly, strength of a wall of the storage portion 35 can be improved.

Moreover, in the printer 3 illustrated in FIG. 3, the second wall 42 faces the window portion 14. The second wall 42 facing the window portion 14 has light-transmissive properties. Light-transmissive properties of the second wall 42 are sufficient when the degree of the property is that the liquid level of the ink in the storage portion 35 is visually recognized through the second wall 42. Accordingly, the operator can recognize the remaining amount of the ink in the tank 9 through the window portion 14 and the second wall 42. Moreover, in the embodiment, the case 31 including the second wall 42 is formed of a material having light-transmissive properties.

The first wall 41 illustrated in FIG. 5 is surrounded by the second wall 42, the third wall 43, the fourth wall 44, and the fifth wall 45, in a plane view. The second wall 42, the third wall 43, the fourth wall 44, and the fifth wall 45 are protruded from the first wall 41 in a + X-axis direction. For this reason, the storage portion 35 is configured to have the second wall 42, the third wall 43, the fourth wall 44, and the fifth wall 45 in a concave shape, with the first wall 41 as a bottom portion. A concave portion 35A is configured to have the first wall 41, the second wall 42, the third wall 43, the fourth wall 44, and the fifth wall 45. The concave portion 35A is configured to be concave toward a − X-axis direction. The concave portion 35A is opened toward the + X-axis direction, that is, toward the sheet member 33. The concave portion 35A stores the ink therein.

The atmosphere chamber 37 is formed on a side of the fifth wall 45 opposite to the concave portion 35A. The atmosphere chamber 37 is protruded from the fifth wall 45 toward a side of the fifth wall 45 opposite to the fourth wall 44, that is, the + Z-axis direction of the fifth wall 45. The atmosphere chamber 37 includes the first wall 41, the fifth wall 45, a sixth wall 46, a seventh wall 47, and an eighth wall 48. Moreover, the first wall 41 of the storage portion 35 and the first wall 41 of the atmosphere chamber 37 are the same wall. That is, in the embodiment, the storage portion 35 and the atmosphere chamber 37 mutually share the first wall 41. In addition, the storage portion 35 and the atmosphere chamber 37 mutually share a part of the fifth wall 45.

The sixth wall 46 is protruded from the fifth wall 45 toward a side of the fifth wall 45 opposite to the fourth wall 44, that is, the + Z-axis direction of the fifth wall 45. The seventh wall 47 is protruded from the fifth wall 45 toward a side of the fifth wall 45 opposite to the fourth wall 44, that is, the + Z-axis direction of the fifth wall 45. The sixth wall 46 and the seventh wall 47 are provided at positions where these walls face each other with the first wall 41 of the atmosphere chamber 37 interposed therebetween in the Y-axis direction. The eighth wall 48 is provided at a position facing the fifth wall 45 with the first wall 41 of the atmosphere chamber 37 interposed therebetween in the Z-axis direction. The sixth wall 46 respectively intersects the fifth wall 45 and the eighth wall 48. The seventh wall 47 also respectively intersects the fifth wall 45 and the eighth wall 48.

In a plane view, the first wall 41 of the atmosphere chamber 37 is surrounded by the fifth wall 45, the sixth wall 46, the seventh wall 47, and the eighth wall 48. The fifth wall 45, the sixth wall 46, the seventh wall 47, and the eighth wall 48 are protruded from the first wall 41 toward the + X-axis direction. For this reason, the atmosphere chamber 37 is configured in a concave shape by the fifth wall 45, the sixth wall 46, the seventh wall 47, and the eighth wall 48, with the first wall 41 as a bottom surface. The concave portion 37A of the atmosphere chamber 37 is configured to have the first wall 41, the fifth wall 45, the sixth wall 46, the seventh wall 47, and the eighth wall 48. The concave portion 37A is configured to be concave toward the − X-axis direction. The concave portion 37A is opened toward the + X-axis direction, that is, toward the sheet member 33. Moreover, the concave portion 35A and the concave portion 37A are mutually partitioned by the fifth wall 45. Moreover, an amount of protrusion of each of the walls from the second wall 42 to the eighth wall 48, which are protrude from the first wall 41, is set to be equal, except for a notch portion 45A of the fifth wall 45. The notch portion 45A of the fifth wall 45 is positioned on the first wall 41 side further than an end portion of the fifth wall 45 on the sheet member 33 side.

The second wall 42 and the sixth wall 46 have steps in the Y-axis direction. The sixth wall 46 is positioned on the third wall 43 side further than the second wall 42, that is, a side in the + Y-axis direction from the second wall 42. In addition, the third wall 43 and the seventh wall 47 have steps in the Y-axis direction. The seventh wall 47 is positioned on the second wall 42 side further than the third wall 43, that is, a side in a − Y-axis direction further than the third wall 43. Also, in a state when viewed the first wall 41 in a plan view, a pour 51 is provided on the fifth wall 45 between the second wall 42 and the sixth wall 46. In addition, in the third wall 43, a supply opening 53 is provided. In the seventh wall 47, an air communication opening 55 is provided. The pour 51 and the supply opening 53 respectively communicate with the outside of the case 31 and the inside of the concave portion 35A. The air communication opening 55 communicates with the outside of the case 31 and the inside of the concave portion 37A.

In the tank 9, two electrodes 61 are provided. The two electrodes 61 are protruded from the outside of the case 31 penetrating the third wall 43 inward the concave portion 35A. The two electrodes 61 are respectively formed in a rod shape, and extend along the Y-axis direction. The two electrodes 61 are arranged in parallel in the X-axis direction with an interval therebetween. The two electrodes 61 are positioned between the fourth wall 44 and the fifth wall 45. The two electrodes 61 are positioned on the fifth wall 45 side further than the supply opening 53. The two electrodes 61 respectively separate from the fourth wall 44 and the fifth wall 45. For this reason, the interval is provided between the two electrodes 61 and the fourth wall 44. In the same manner, an interval is provided between the two electrodes 61 and the fifth wall 45 as well.

The two electrodes 61 are used for detecting the remaining amount of the ink which is stored in the concave portion 35A. Based on a change in an electrical resistance between the two electrodes 61, it can be detected whether or not the remaining amount of the ink is below a predetermined amount. In what follows, when the two electrodes 61 are respectively identified, the two electrodes 61 are respectively designated a first electrode 61A and a second electrode 61B. In the X-axis direction, the first electrode 61A is provided on the first wall 41 side further than the second electrode 61B.

In Example 1, in the Z-axis direction, any one of the two electrodes 61 is provided at a position higher than the other. In an example illustrated in FIG. 5, the first electrode 61A of the two electrodes 61 is provided at a position higher than the second electrode 61B, in the Z-axis direction. Also, a support portion 63 is provided between the first electrode 61A and the fourth wall 44. The support portion 63 is provided on the inside of the concave portion 35A of the case 31.

The support portion 63 is protruded from the fourth wall 44 toward the fifth wall 45. The support portion 63 includes a support wall 64 facing the fifth wall 45 and a side wall 65 intersecting both the support wall 64 and the fourth wall 44. The first electrode 61A is positioned on the fifth wall 45 side of the support wall 64. The first electrode 61A is supported by the support wall 64. In Example 1, the support wall 64 supports the first electrode 61A throughout the entire portion of the first electrode 61A which extends into the concave portion 35A.

In the concave portion 35A, the first electrode 61A is positioned on the first wall 41 side further than the side wall 65. The second electrode 61B is positioned on a side of the support portion 63 opposite to the first wall 41, that is, the sheet member 33 side of the support portion 63. For this reason, the side wall 65 is positioned between the first electrode 61A and the second electrode 61B in the X-axis direction. The second electrode 61B is provided on the sheet member 33 side further than the support portion 63, and is separated from the support portion 63. That is, an interval is provided between the second electrode 61B and the side wall 65.

Moreover, in Example 1, the first electrode 61A of the two electrodes 61 is provided at a position higher than the second electrode 61B in the Z-axis direction. However, relative heights of the two electrodes 61 are not limited thereto. As the relative heights of the two electrodes 61, it is possible to adopt a configuration in which the first electrode 61A and the second electrode 61B have relatively the same height as each other. In addition, as the relative heights of the two electrodes 61, it is possible to adopt a configuration in which the height of the second electrode 61B is higher than that of the first electrode 61A. Further, when the second electrode 61B is higher than the first electrode 61A, it is possible to adopt a configuration in which the support portion 63 is provided between the second electrode 61B and the fourth wall 44.

As illustrated in FIG. 5, the sheet member 33 faces the first wall 41 with the second wall 42 to the eighth wall 48 interposed therebetween in the X-axis direction. In plane view, the sheet member 33 is a size covering the concave portion 35A and the concave portion 37A. The sheet member 33 is bonded to an end portion of each of the second wall 42 to the eighth wall 48 in a state of including an interval between the sheet member 33 and the first wall 41. Accordingly, the concave portion 35A and the concave portion 37A are sealed by the sheet member 33. For this reason, the sheet member 33 can be considered as a lid for the case 31. In a state in which the sheet member 33 is bonded to the case 31, an interval is provided between the sheet member 33 and the notch portion 45A. The concave portion 37A and the concave portion 35A communicate with each other by the interval between the sheet member 33 and the notch portion 45A.

Figure 6:
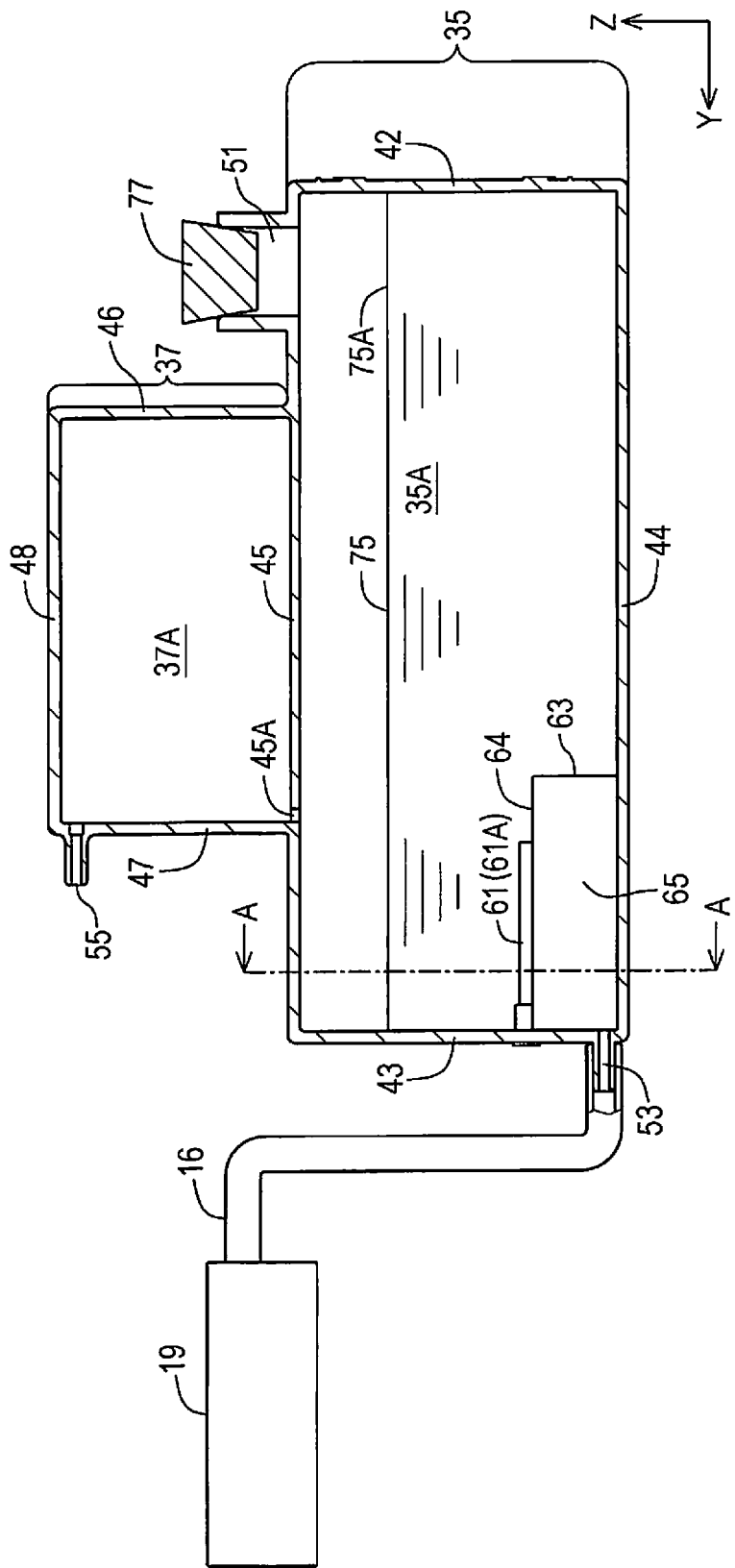
FIG. 6 is a view illustrating a flow of ink from the tank to a print head in Example 1.

In the tank 9, as illustrated in FIG. 6, ink 75 is stored on the inside of the concave portion 35A. In FIG. 6, a sectional view of the pour 51, the supply opening 53, and the air communication opening 55 of the tank 9 taken along an YZ flat surface is illustrated. In the embodiment, in a state in which the printer 3 is used to print, the supply tube 16 is connected to the supply opening 53, and a stopper 77 is put into the pour 51. The ink 75 in the concave portion 35A is supplied from the supply opening 53 to the print head 19 through the supply tube 16. The ink 75 in the concave portion 35A is transferred to the print head 19 side when printing by the print head 19. For this reason, while printing by the print head 19, pressure in the concave portion 35A is lower than atmospheric pressure. When the pressure in the concave portion 35A is lower than the atmospheric pressure, the atmosphere in the concave portion 37A is transferred into the concave portion 35A through the notch portion 45A. Accordingly, the pressure in the concave portion 35A is easily maintained as the atmospheric pressure.

Figure 7:
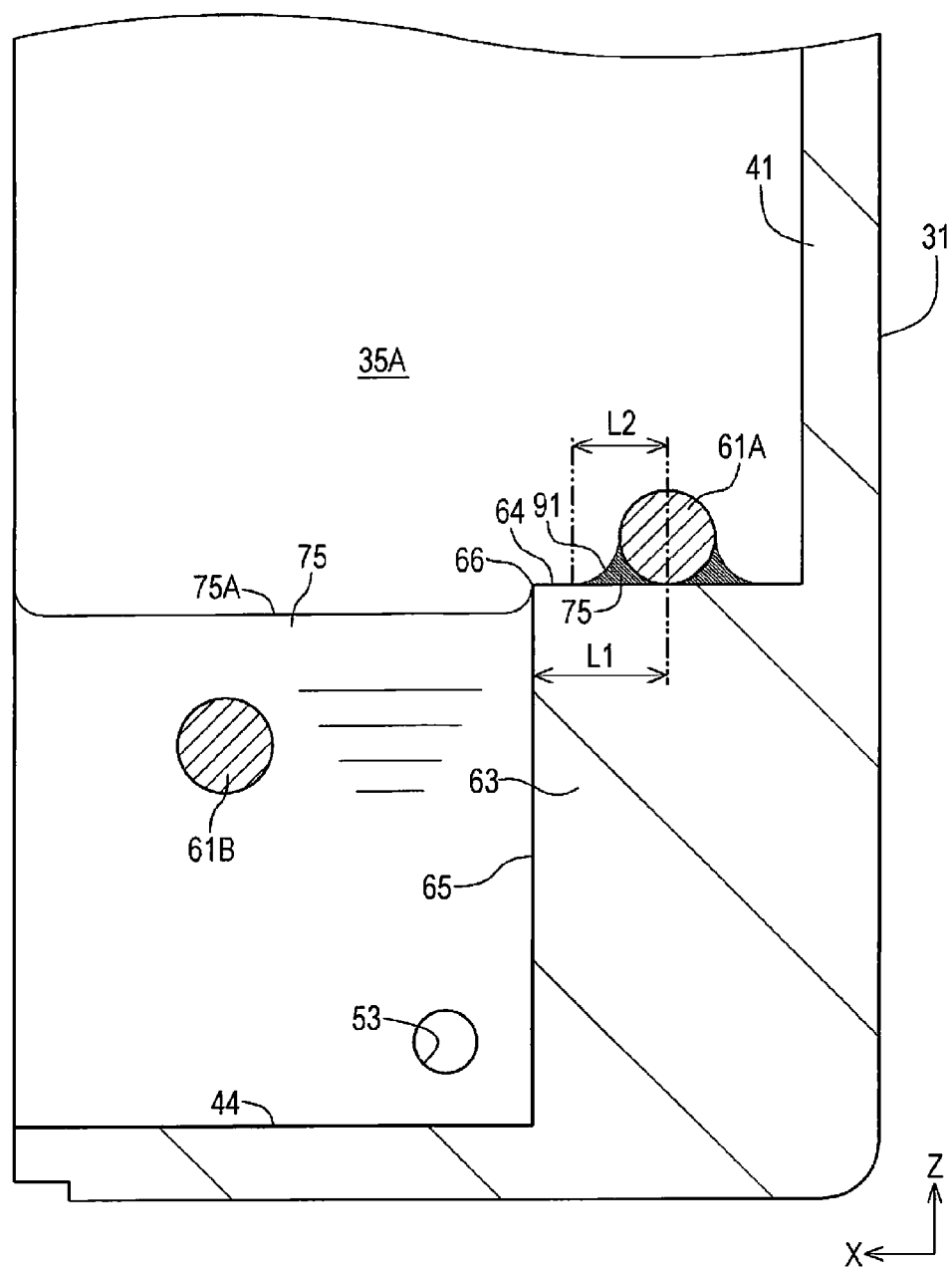
FIG. 7 is a sectional view taken along an A-A line of FIG. 6.

According to the above description, the ink 75 inside the tank 9 is supplied to the print head 19. When the ink 75 in the concave portion 35A in the tank 9 is consumed, the liquid level 75A of the ink 75 is fallen in a vertically downward direction. At this time, as illustrated in FIG. 7 which is a sectional view taken along a line A-A in FIG. 6, when the liquid level 75A of the ink 75 is fallen lower than the first electrode 61A in the vertically downward direction, an electrical resistance value between the first electrode 61A and the second electrode 61B is great. In the printer 3, based on a change of the electrical resistance between, the first electrode 61A and the second electrode 61B, it is determined whether the remaining amount of the ink 75 reaches a lower limit.

Here, a distance L1 from the center position of the first electrode 61A to the support portion end portion 66 (side wall 65) is preferably set to be longer than a distance L2 from the center position of the first electrode 61A to the end portion of the meniscus 91. The meniscus 91 is formed in the ink 75 maintained between the first electrode 61A and the support wall 64, on the second electrode 61B side of the first electrode 61A. The distance L2 is a distance between the end portion of the support wall 64 of the meniscus 91 and the center position of the first electrode 61A. When a relationship between the distances is set to the distance L1>the distance L2, the ink 75 can be divided by a boundary between the support wall 64 and the side wall 65. For this reason, at the time when the liquid level 75A is fallen lower than the first electrode 61A in the vertical downward direction, the electrical resistance between the first electrode 61A and the second electrode 61B is easily reliably changed. Accordingly, detection accuracy of the remaining amount of the ink 75 is easily improved.

Moreover, in Example 1, if the relationship between the distance L1 and the distance L2 is the distance L1>the distance L2, even when the first electrode 61A and the second electrode 61B are set to have relatively the same height as each other, there is a case in which the ink 75 can be divided by the boundary between the support wall 64 and the side wall 65. For this reason, in Example 1, it is possible to adopt a configuration in which the first electrode 61A and the second electrode 61B have relatively the same height as each other. In the same manner, in Example 1, even when the second electrode 61B is higher than the first electrode 61A, there is a case in which the ink 75 can be divided by the boundary between the support wall 64 and the side wall 65. For this reason, in Example 1, it is also possible to adopt a configuration in which the second electrode 61B is higher than the first electrode 61A.

Figure 8:
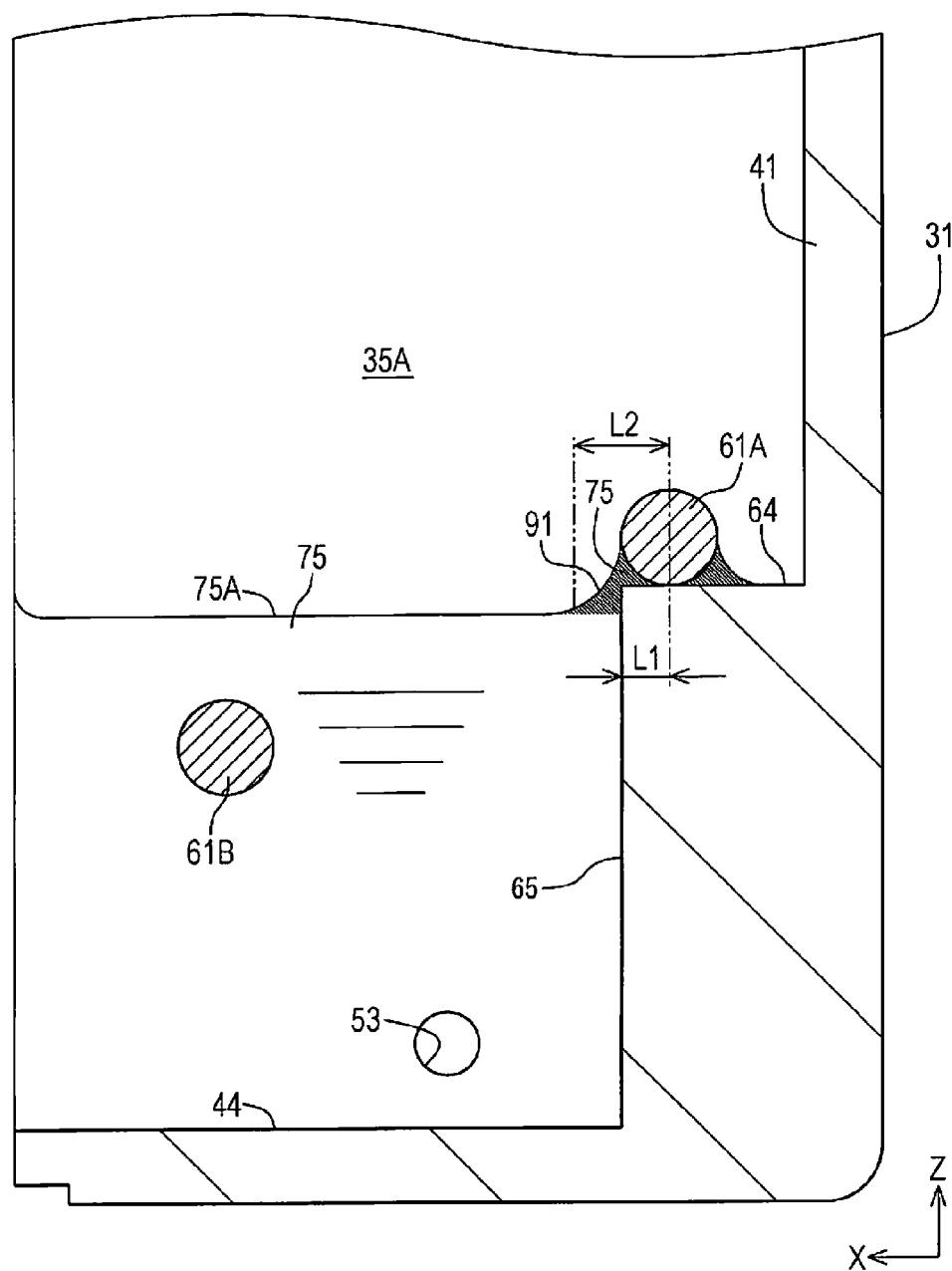
FIG. 8 is a view illustrating a comparative example.

On the other hand, in a relationship of the distance L1<the distance L2, even when the liquid level 75A is positioned lower than the first electrode 61A in the vertically downward direction, as illustrated in FIG. 8 illustrating a comparative example, the first electrode 61A and the second electrode 61B may be connected to each other by the ink 75. In this case, regardless of whether the liquid level 75A is fallen lower than the first electrode 61A in the vertically downward direction, a change of the electrical resistance between the first electrode 61A and the second electrode 61B is getting slow. For this reason, it is difficult to determine whether the remaining amount of the ink 75 reaches the lower limit. As a result, it is difficult to improve the detection accuracy of the remaining amount of the ink 75. For the reasons set forth above, it is preferable that the relationship between the distance L1 and the distance L2 is set to the distance L1>the distance L2. Also, in Example 1, the distance L1 and the distance L2 are set to have the relationship of the distance L1>the distance L2.

Figure 9:
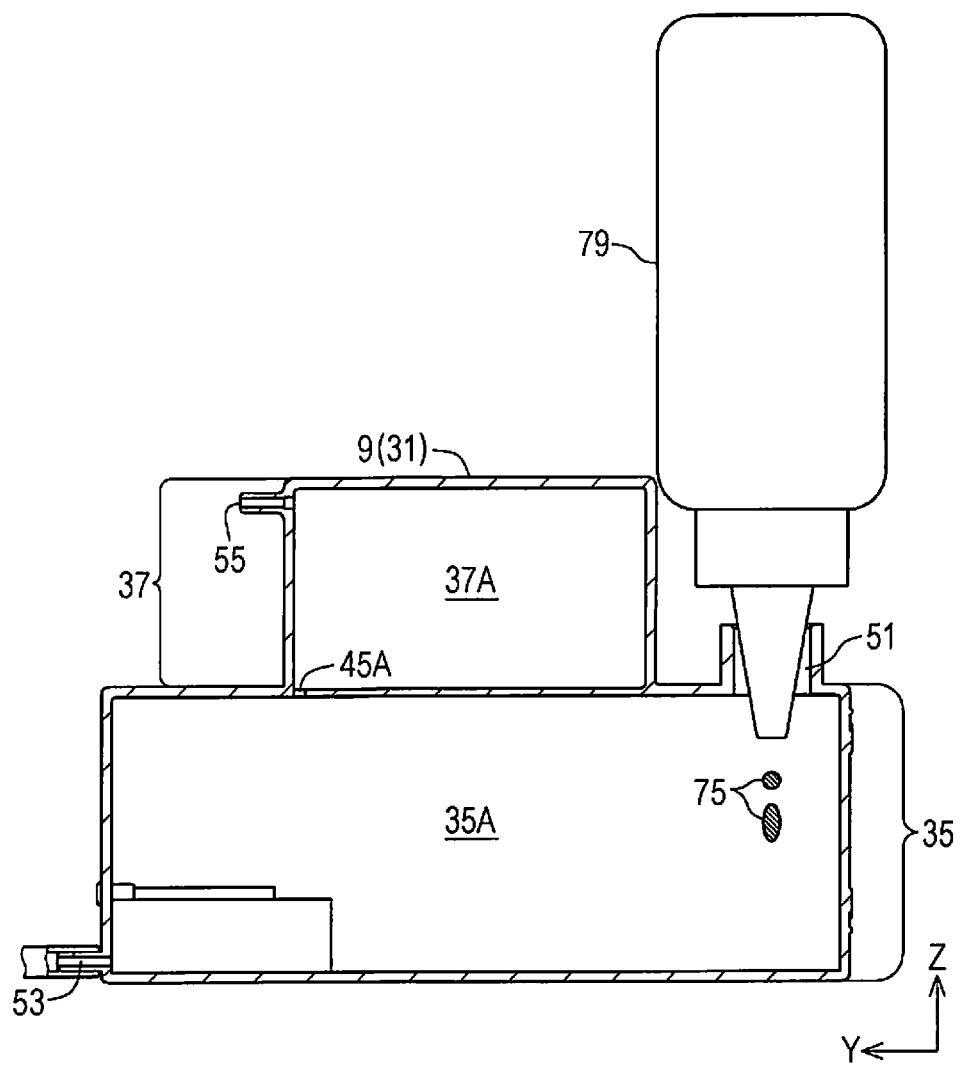
FIG. 9 is a view illustrating the pouring of ink into the tank in Example 1.

In the printer 3, when it is determined that the remaining amount of the ink 75 reaches the lower limit, it promotes new ink replenishment with respect to the operator. By receiving this, the operator can replenish new ink from the pour 51 into the tank 9. At this time, as illustrated in FIG. 9, the operator pours the new ink 75 from a bottle 79, or the like which is filled with the new ink 75, into the tank 9 through the pour 51. Moreover, a detection process of the change of the electrical resistance between the first electrode 61A and the second electrode 61B, a determination process that determines whether or not the remaining amount of the ink 75 reaches the lower limit, and a promotion process of replenishment of new ink are performed by a control circuit (not illustrated).

In Example 1, the support portion 63 is provided between the first electrode 61A and the fourth wall 44, it is possible to adopt a configuration in which the first electrode 61A is mounted on the support portion 63. According to this configuration, the first electrode 61A extending to the concave portion 35A can be supported by the support portion 63. For this reason, deflection accuracy of the first electrode 61A, that is, the positional accuracy of the end portion of the first electrode 61A in the concave portion 35A is easily improved. As a result, the detection accuracy of the remaining amount of the ink 75 is easily improved.

In addition, in Example 1, the first electrode 61A supported by the support portion 63 is positioned in a vertically upward direction further than the second electrode 61B. By such a configuration, when the liquid level 75A is fallen lower than the first electrode 61A in the vertically downward direction, the change of the electrical resistance between the first electrode 61A and the second electrode 613 is detected. Since the first electrode 61A is supported by the support portion 63, the positional accuracy is improved more than the second electrode 61B. For this reason, in Example 1, in comparison with a configuration in which the second electrode 61B is positioned in the vertically upward direction further than the first electrode 61A, the detection accuracy of the remaining amount of the ink 75 is easily improved.

Figure 10:
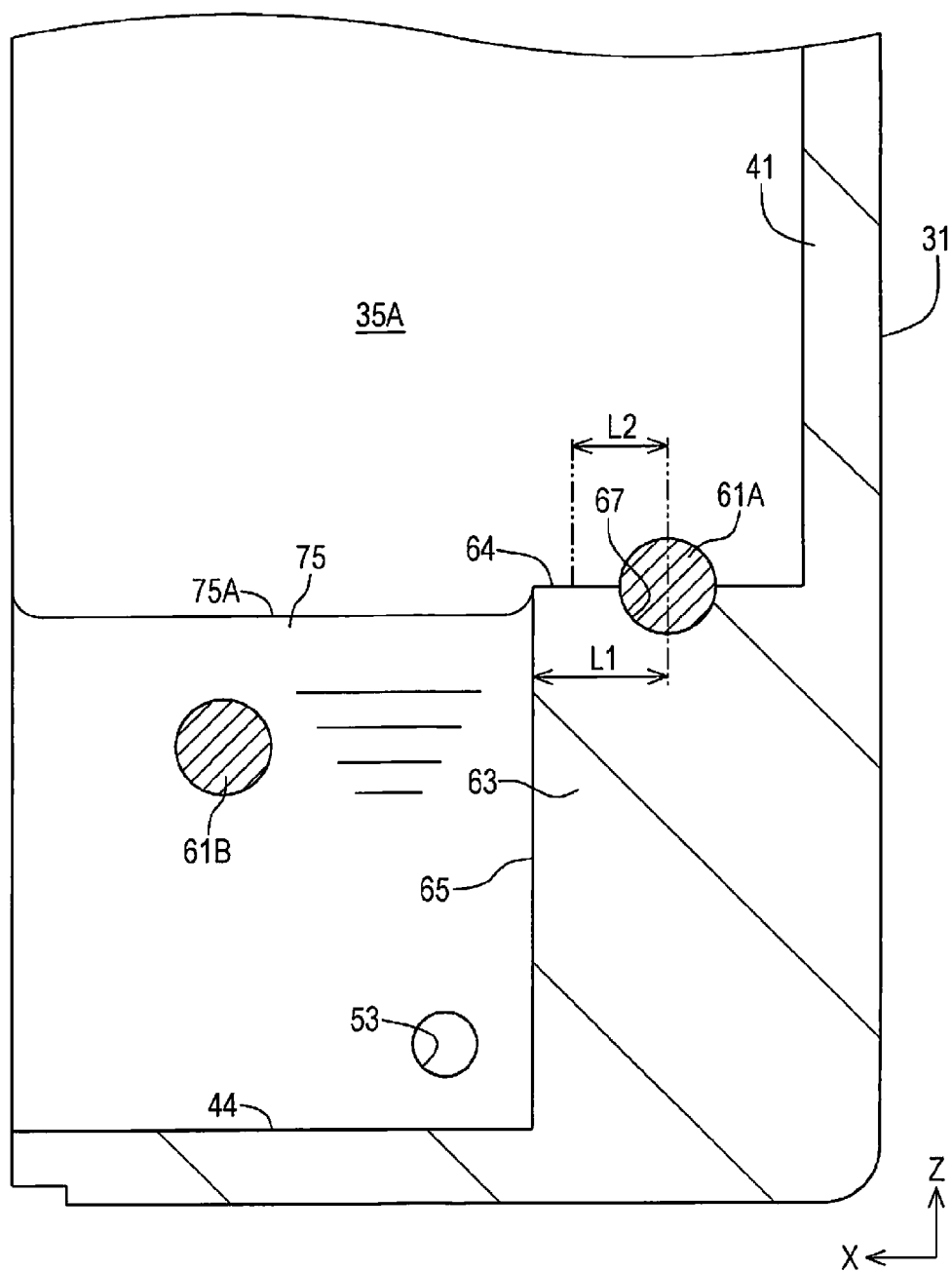
FIG. 10 is a view illustrating a groove in Example 1.

In Example 1, it is also possible to adopt a configuration in which the groove 67 is provided on the support wall 64 of the support portion 63, as illustrated in FIG. 10. The groove 67 is provided on the support wall 64, and is provided so as to be concave from the support wall 64 toward the fourth wall 44 side. The groove 67 extends in the support wall 64 along the Y-axis direction, that is, along an extending direction of the first electrode 61A. In a configuration in which the groove 67 is included, the first electrode 61A is mounted in the support wall 64 in a state of overlapping with the groove 67. For this reason, at least a part of the first electrode 61A is stored in the groove 67. According to the configuration, the positional accuracy of the first electrode 61A on the inside of the concave portion 35A is easily further improved. As a result, the detection accuracy of the remaining amount of the ink 75 is easily further improved.

EXAMPLE 2

Figure 11:
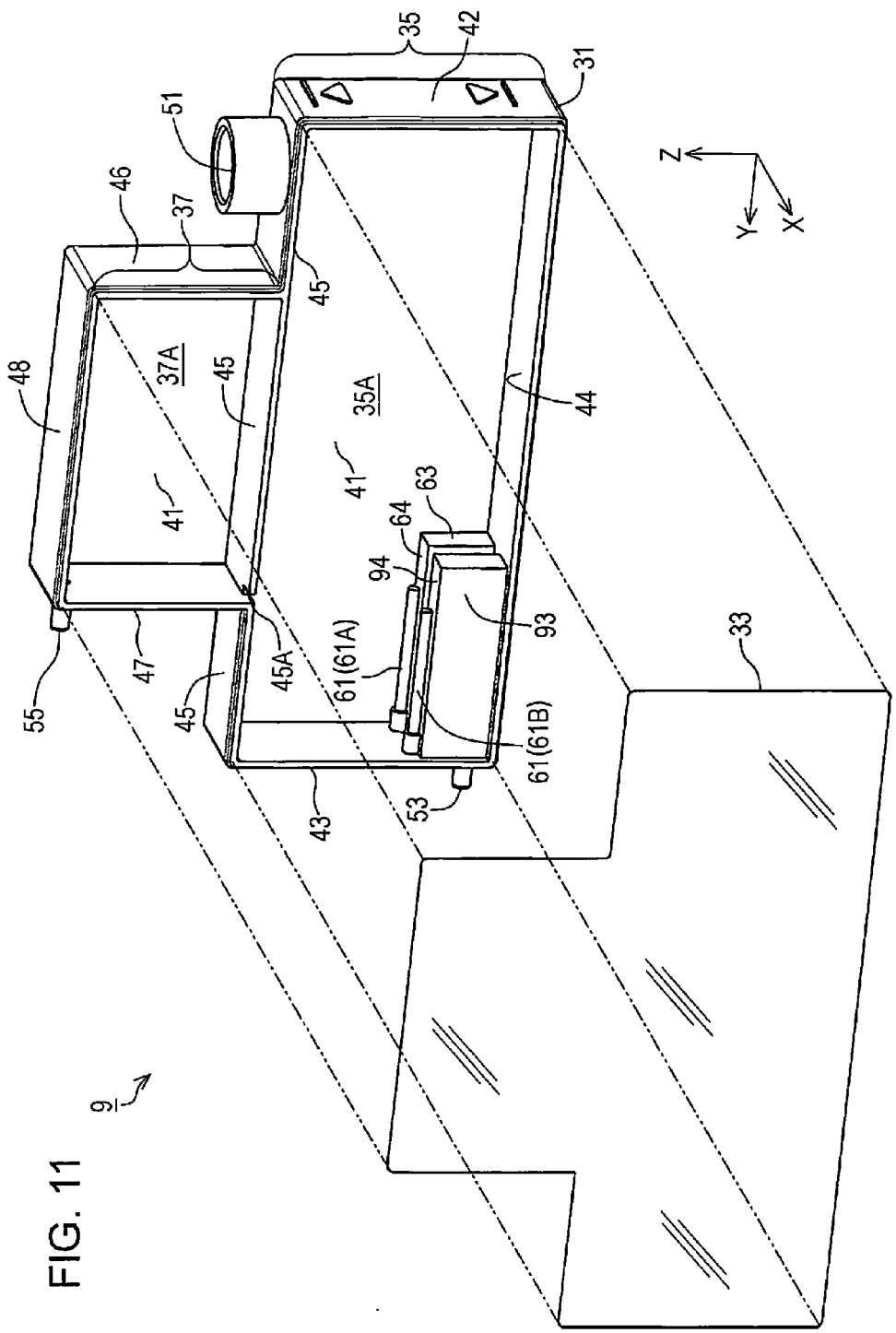
FIG. 11 is an exploded perspective view illustrating a schematic configuration of a tank in Example 2.

As illustrated in FIG. 11, the tank 9 of Example 2 is different from the tank 9 of Example 1 in that the first electrode 61A and the second electrode 61B have relatively the same height as each other and a support portion 93 is provided between the second electrode 61B and the fourth wall 44. Except the above described differences, the tank 9 of Example 2 has the same configuration as that of the tank 9 of Example 1. For this reason, in what follows, in the configuration same as that of Example 1, the same numerals as that of Example 1 are attached thereto and a detailed description will be omitted.

Figure 12:
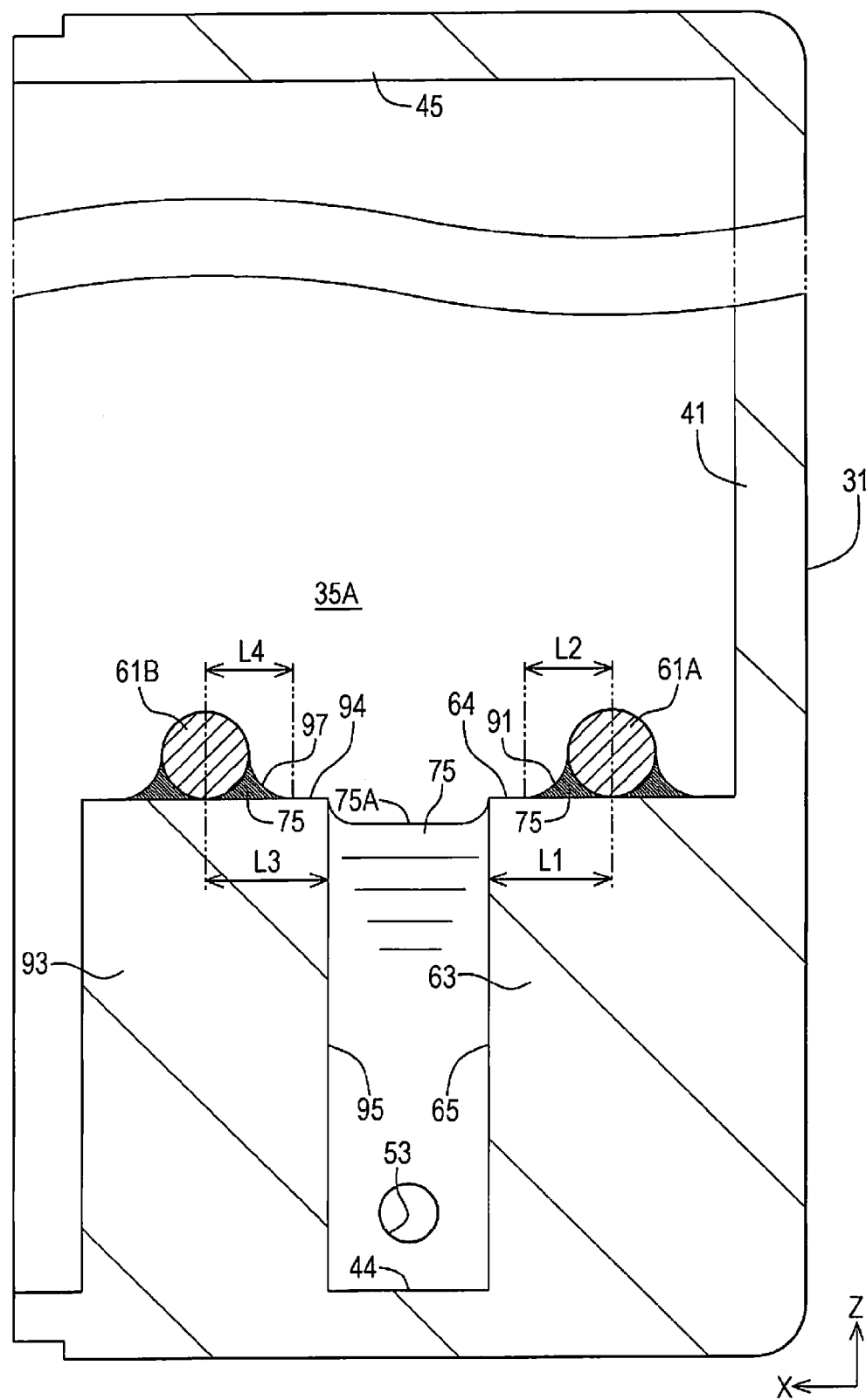
FIG. 12 is a view illustrating relative heights of a first electrode and a second electrode in Example 2.

In Example 2, as illustrated in FIG. 12, relative heights of the first electrode 61A and the second electrode 61B are the same as each other. That is, a distance from the fourth wall 44 to the first electrode 61A and a distance from the fourth wall 44 to the second electrode 61B are the same as each other. Moreover, in FIG. 12, a sectional view when the first electrode 61A and the second electrode 61B, and the support portion 63 and the support portion 93 are cut along the XZ flat surface, is illustrated.

Also, the support portion 93 is provided between the second electrode 61B and the fourth wall 44. The support portion 93 is provided in the concave portion 35A of the case 31. The support portion 93 is protruded from the fourth wall 44 toward the fifth wall 45 side. The support portion 93 includes the support wall 94 facing the fifth wall 45, and the side wall 95 intersecting both the support wall 94 and the fourth wall 44. The second electrode 61B is positioned on the fifth wall 45 side of the support wall 94. The second electrode 61B is supported by the support wall 94. In Example 2, as illustrated in FIG. 11, the support wall 94 supports the entire portion of the second electrode 61B extending into the concave portion 35A, in the second electrode 61B.

In Example 2, as illustrated in FIG. 12, when the liquid level 75A of the ink 75 is fallen lower than the first electrode 61A or the second electrode 61B in the vertically downward direction, a value of the electrical resistance between the first electrode 61A and the second electrode 61B is great. Also in Example 2, in the same manner as Example 1, based on a change of the electrical resistance between the first electrode 61A and the second electrode 61B, it is determined whether or not the remaining amount of the ink 75 reaches the lower limit. In Example 2, the distance L3 from the center position of the second electrode 61B to the side wall 95 is preferably set to be longer than the distance L4 from the center position of the second electrode 61B to the end portion of the meniscus 97. In Example 2, the distance L3 and the distance L4 are set to have a relationship of the distance L3>the distance L4.

On the first electrode 61A side of the second electrode 61B, the meniscus 97 is formed in the ink 75 maintained between the second electrode 61B and the support wall 94. The distance L4 is a distance between the end portion of the meniscus 97 on the support wall 94 side and the center position of the second electrode 61B. When the relationship is set to be the distance L3>the distance L4, the ink 75 can be divided by a boundary between the support wall 94 and the side wall 95. For this reason, at the time when the liquid level 75A is fallen lower than the second electrode 61B in the vertically downward direction, the electrical resistance between the second electrode 61B and the first electrode 61A is easily reliably changed. Accordingly, the detection accuracy of the remaining amount of the ink 75 is further improved.

In Example 2, a configuration is adopted in which the first electrode 61A is mounted on the support portion 63, and the second electrode 61B is mounted on the support portion 93. According to the configuration, the first electrode 61A extending to the concave portion 35A can be supported by the support portion 63, and the second electrode 61B extending to the concave portion 35A can be supported by the support portion 93. For this reason, the deflection accuracy of each of the first electrode 61A and the second electrode 61B, that is, the positional accuracy of each of the end portions of the first electrode 61A and the second electrode 61B in the concave portion 35A is easily improved. As a result, the detection accuracy of the remaining amount of the ink 75 is easily improved.

Also in Example 2, it is possible to adopt a configuration in which the groove 67 is provided on the support wall 64 of the support portion 63. The groove 67 is similar to that of Example 1, a detailed description thereof will be omitted. According to the configuration including the groove 67, in the same manner as Example 1, also in Example 2, the positional accuracy of the first electrode 61A on the inside of the concave portion 35A is easily further improved. As a result, the detection accuracy of the remaining amount of the ink 75 is easily further improved.

Figure 13:
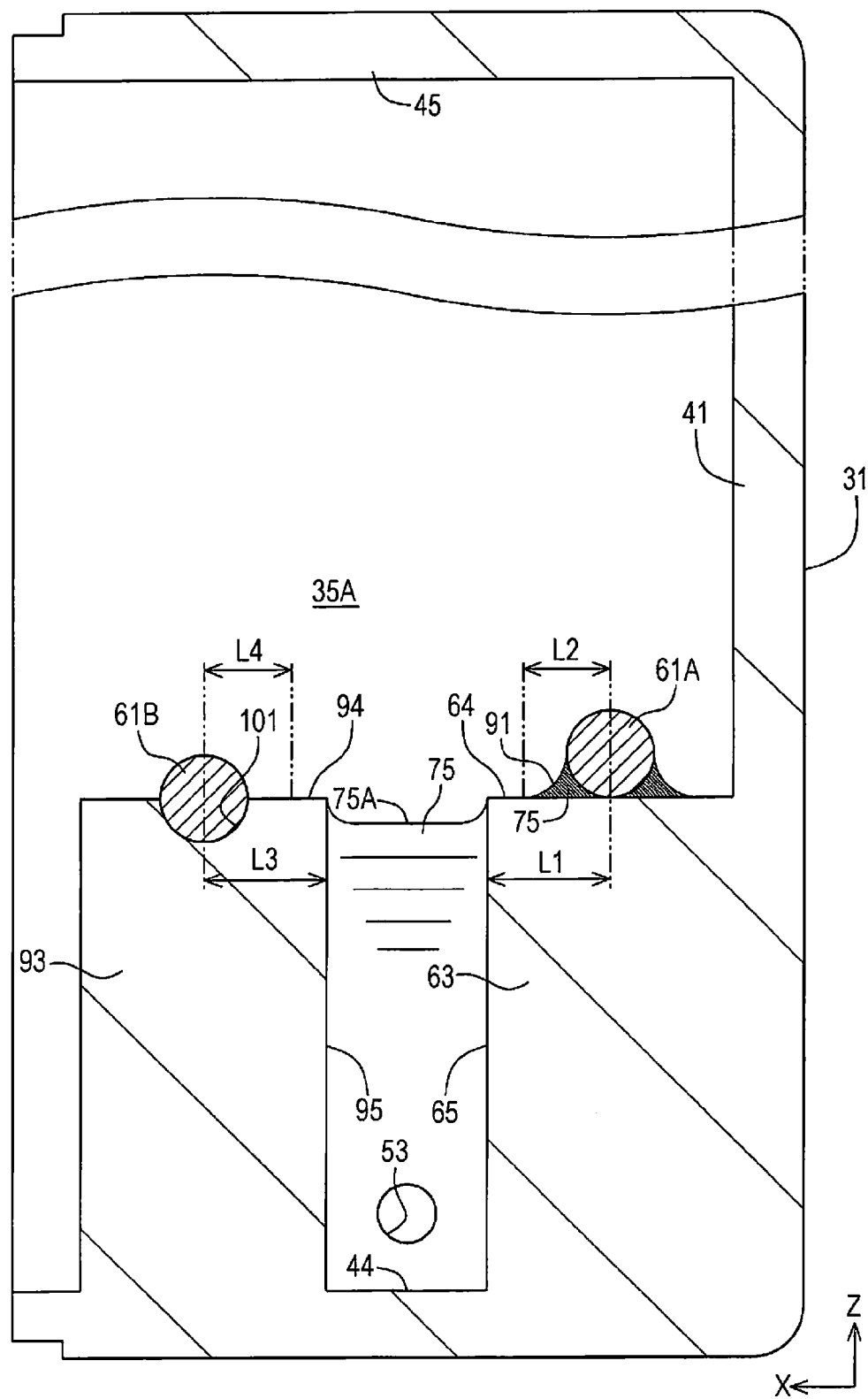
FIG. 13 is a view illustrating a groove in Example 2.

Incidentally, in Example 2, it is possible to adopt a configuration in which a groove 101 is provided on the support wall 94 of the support portion 93 as illustrated in FIG. 13. The groove 101 is provided on the support wall 94 so as to be concave from the support wall 94 toward the fourth wall 44 side. In the support wall 94, the groove 101 extends along the Y-axis direction, that is, along the extending direction of the second electrode 61B. In a configuration including the groove 101, the second electrode 61B is mounted on the support wall 94 in a state of overlapping the groove 101. For this reason, at least a part of the second electrode 61B is stored in the groove 101. According to the configuration, the positional accuracy of the second electrode 61B on the inside of the concave portion 35A is easily further improved. As a result, the detection accuracy of the remaining amount of the ink 75 is easily further improved.

Moreover, in Example 2, even in a configuration including only one of the groove 67 and the groove 101, an effect described above can be obtained. Further, in Example 2, it is also possible to adopt a configuration in which the groove 67 is provided on the support portion 63, and the groove 101 is provided on the support portion 93. According to the configuration, the positional accuracy of both the first electrode 61A and the second electrode 61B in the concave portion 35A is easily further improved. As a result, the detection accuracy of the remaining amount of the ink 75 is easily further improved. Moreover, in Example 2, the support portion 93 corresponds to a second support portion, the support wall 94 corresponds to a second support wall, the side wall 95 corresponds to a second side wall, and the groove 101 corresponds to a second groove.

REFERENCE SIGNS LIST

1 COMPLEX MACHINE
3 PRINTER
5 SCANNER
7 CASE
9 TANK
11 MECHANISM BODY
12 OPERATION PANEL
13A POWER BUTTON
13B OPERATION BUTTON
14 WINDOW PORTION
15 PRINTING UNIT
16 SUPPLY TUBE
17 CARRIAGE
19 PRINT HEAD
21 RELAY UNIT
22 TRANSPORTATION ROLLER
23 MOTOR
25 TIMING BELT
31 CASE
35A CONCAVE PORTION
33 SHEET MEMBER
35 STORAGE PORTION
37 ATMOSPHERE CHAMBER
37A CONCAVE PORTION
41 FIRST WALL
42 SECOND WALL
43 THIRD WALL
44 FOURTH WALL
45 FIFTH WALL
45A NOTCH PORTION
46 SIXTH WALL
47 SEVENTH WALL
48 EIGHTH WALL
51 POUR
53 SUPPLY OPENING
55 AIR COMMUNICATION OPENING
61 ELECTRODE
61A FIRST ELECTRODE
61B SECOND ELECTRODE
63 SUPPORT PORTION
64 SUPPORT WALL
65 SIDE WALL
66 SUPPORT PORTION END PORTION
67 GROOVE
75 INK
75A LIQUID LEVEL
77 STOPPER
79 BOTTLE
91 MENISCUS
93 SUPPORT PORTION
94 SUPPORT WALL
95 SIDE WALL
97 MENISCUS
101 GROOVE
L1, L2, L3, and L4 DISTANCE
P PRINT MEDIUM

The invention claimed is:
1. A liquid storage container comprising:
a storage portion configured to store liquid;
a first electrode that is a rod-shaped electrode penetrating a wall of the storage portion from an outside of the storage portion to an inside of the storage portion, and extends in a direction intersecting a vertical direction in the storage portion;
a second electrode that is a rod-shaped electrode penetrating the wall of the storage portion from the outside of the storage portion to the inside of the storage portion, is arranged in parallel to the first electrode in a direction intersecting the extending direction of the first electrode in the storage portion, and extends in a direction intersecting the vertical direction in a state of being separated from the first electrode; and
a support portion that is provided in the storage portion, and supports the first electrode, wherein in the vertical direction, with respect to the first electrode, a height of the second electrode is equal to a height of the first electrode or lower than the height of the first electrode, wherein the support portion includes a support wall supporting the first electrode, and a side wall which intersects the support wall on the second electrode side of the first electrode in a position closer to the first electrode than the second electrode and extends downwardly from the support wall, wherein an interval is provided between the second electrode and the side wall, and wherein the support wall is configured to protrude to the second electrode side further than a meniscus formed in the liquid between the first electrode and the support wall on the second electrode side of the first electrode.

2. The liquid storage container according to claim 1, wherein in the vertical direction, with respect to the first electrode, the height of the second electrode is lower than the height of the first electrode.

3. The liquid storage container according to claim 1, wherein a groove which is concave toward a side of the support wall opposite to the first electrode side is provided in the support wall of the support portion, and wherein at least a part of the first electrode is placed in the groove.

4. The liquid storage container according to claim 1, further comprising:

a second support portion that is provided in the storage portion and supports the second electrode, wherein the second support portion includes a second support wall which supports the second electrode, and the second side wall which intersects the second support wall on the first electrode side of the second electrode and on the second electrode side further than the side wall and extends downwardly from the second support wall, and wherein the second support wall is configured to protrude to the first electrode side further than the meniscus of the liquid formed between the second electrode and the second support wall on the first electrode side of the second electrode.

5. The liquid storage container according to claim 4, wherein a second groove which is concave toward a side of the second support wall opposite to the second electrode side is provided in the second support wall of the second support portion, and wherein at least a part of the second electrode is placed in the second groove.

6. A liquid storage container comprising:

a storage portion configured to store liquid;

a first electrode configured to be used for detecting the liquid;

a second electrode configured to be used for detecting the liquid; and a support portion that supports the first electrode, wherein the first electrode has a rod shape which extends from the outside of the storage portion to the inside of the storage portion, wherein the second electrode is disposed by being separated from the first electrode, wherein the support portion includes a support wall, which is a surface brought into contact with the first electrode, and an end portion positioned between the first electrode the second electrode, wherein an interval is provided between the second electrode and the end portion, and wherein a distance between a part of the support wall brought into contact with the first electrode and the end portion of the support wall is made to be greater than a width of a meniscus of the liquid which is formed between the first electrode and the support wall, in a direction from the first electrode toward the end portion.

7. The liquid storage container according to claim 6, wherein the storage portion includes a first wall, a second wall which is formed so as to be protruded from the first wall, in a direction intersecting the first wall, a third wall which is formed so as to be protruded from the first wall and formed at a position facing the second wall, in a direction intersecting the first wall, a fourth wall which is protruded from the first wall, in a direction intersecting the first wall, the second wall, and the third wall, and a fifth wall which is protruded from the first wall in the direction intersecting the first wall, the second wall, and the third wall, and wherein the first electrode penetrates the third wall of the storage portion from the outside of the storage portion toward the inside of the storage portion, and extends from the third wall toward the second wall.

8. The liquid storage container according to claim 7, wherein the second electrode penetrates the third wall of the storage portion from the outside of the storage portion toward the inside of the storage portion, and extends from the third wall toward the second wall.

9. The liquid storage container according to claim 7, wherein the second electrode is disposed by being separated from the first electrode in a direction intersecting the first wall.

10. The liquid storage container according to claim 7, wherein the support portion is positioned between the fourth wall and the fifth wall, and wherein a distance between the first electrode and the fourth wall is equal to or greater than a distance between the second electrode and the fourth wall.

11. The liquid storage container according to claim 7, wherein the end portion is positioned between the first electrode and the second electrode in a direction intersecting the first wall.

12. The liquid storage container according to claim 7, wherein the support portion includes a side wall which extends from the end portion toward the fourth wall.

13. The liquid storage container according to claim 7, wherein a curved surface portion is provided between the third wall and the fifth wall, and the third wall, the fifth wall, and the curved surface portion form a single surface with no boundary therein.

14. The liquid storage container according to claim 13, wherein the second wall is a viewable surface where it is possible to visually recognize a liquid level of the liquid, and there is an angle portion between the second wall and the fifth wall, and between the second wall and the fourth wall.

\* \* \* \* \*